Patented Mar. 28, 1950

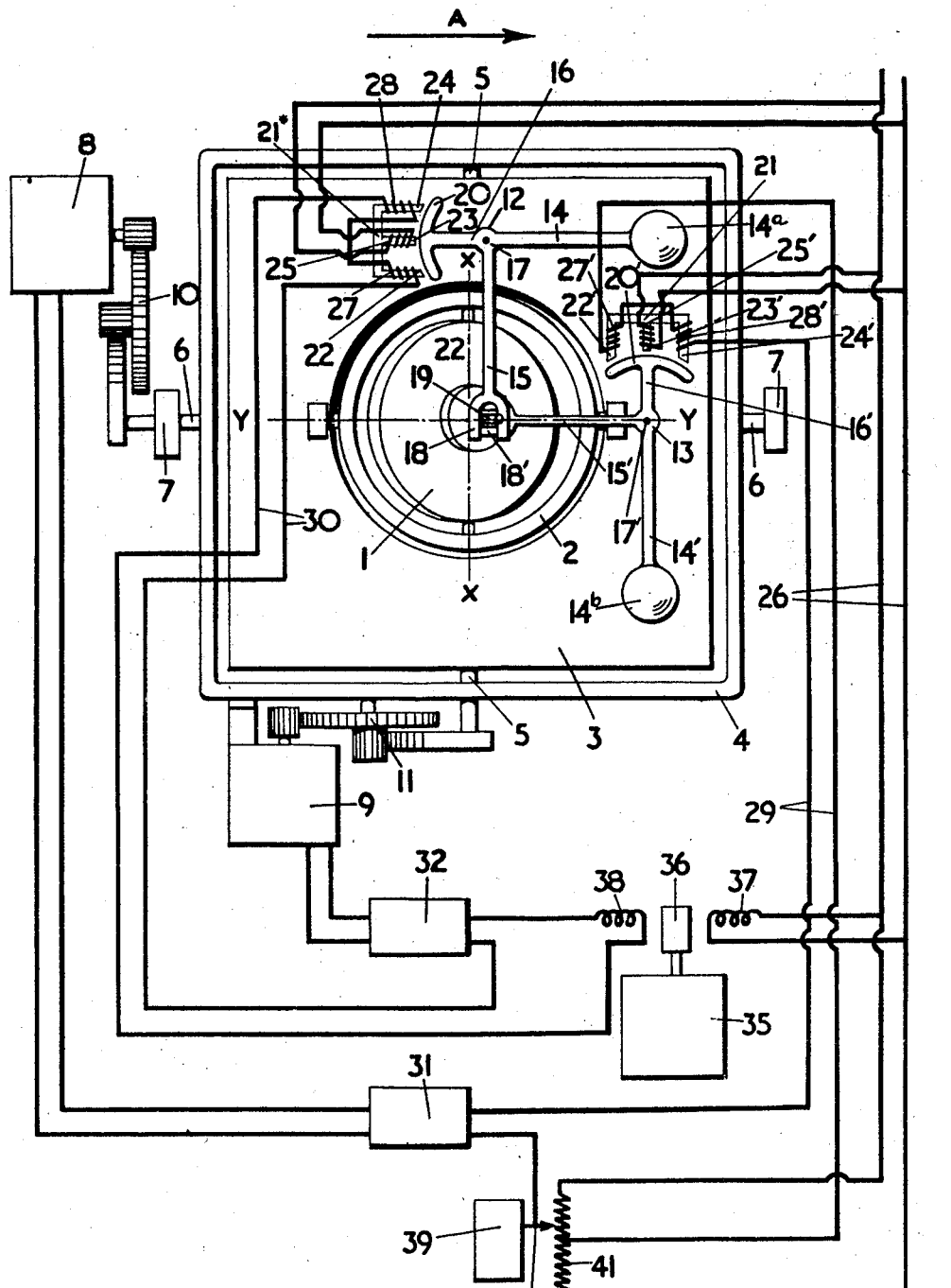

2,501,885

UNITED STATES PATENT OFFICE 2,501,885

GYROSCOPIC SYSTEM

Jeffery Walton Barnes, Farnborough, and John St. Leger Philpot, Oxford, England

Application November 20, 1945, Serial No. 629,754
In Great Britain August 24, 1945

20 Claims. (Cl. 74—5.44)

This invention relates to a gyroscopic system of the type used with moving vehicles and in which the gyroscope is adapted to be erected to a position in which its spin axis is tilted forwardly in the direction of travel of the vehicle and follows the vehicle in azimuth. The gyroscope controls a member which defines a plane having a given relation to the spin axis of the erected gyroscope, the plane being conveniently chosen as a horizontal one.

One object of this invention is to provide a gyroscopic system of the type specified having a novel combination of a servo system and means responsive to accelerations in and parallel to the plane of the aforementioned member. A further object is to obtain a gyroscopic system of the type specified with a tilted axis gyroscope in which compensation is provided for changes in speed. The speed may change in a fore and aft direction requiring changes in forward tilt of the gyroscope to compensate or it may change in a lateral direction (change in side slip) requiring a change in lateral tilt.

According to this invention, a gyroscopic system of the type specified having a tilted axis gyroscope with the top end of the gyro axis tilted forwards in the direction of travel, is provided with an erection system associated with the member controlled by the gyroscope comprising devices responsive to fore and aft and lateral accelerations in the plane of said member, said devices being operatively connected to the gyroscope to bring the said member to the horizontal position.

Another feature of this invention consists in a gyroscopic system of the type specified and having a tilted axis gyroscope with the top end of the gyro axis tilted forwards in the direction of travel, in which an erection device is mounted to move in a plane parallel to said member under changes of fore and aft acceleration and is adapted when moved to apply a torque about the roll axis of the gyroscope to cause the gyroscope to precess about the pitch axis, and an erection device is mounted to move in a plane parallel to the said member under changes in transverse acceleration and is adapted when moved to apply a torque about the pitch axis of the gyroscope to cause the gyroscope to precess about the roll axis whereby the erection devices bring the said member to the horizontal position.

A further feature of this invention applied to a gyroscopic system of the type specified having a tilted axis gyroscope with the top end of the gyro axis tilted forwards in the direction of travel comprises an erection device mounted on the stabilized member for movement in a plane parallel to said member under changes in fore and aft accelerations adapted when so moved to apply a torque to the gyroscope about its roll axis and thereby cause the gyroscope to precess about its pitch axis and an erection device mounted on said stabilized member for movement in a plane parallel to said member under changes in transverse or sideways acceleration adapted when so moved to apply a torque to the gyroscope about its pitch axis and thereby cause the gyroscope to precess about its roll axis and means for applying compensations for change in speed of the craft.

The invention will be particularly described with reference to the accompanying drawing which illustrates in plan view a gyroscopic system according to this invention.

In the drawing the arrow A indicates the direction of travel. The gyroscope comprises a rotor mounted in a casing 1 which is pivotally mounted in an inner gimbal ring 2 for movement about the pitch axis X—X. The ring 2 in turn is pivotally mounted in a circular hole in a platform 3, so that the gyroscope and the ring 2 can move about the roll axis Y—Y. Thus the gyroscope has three degrees of freedom. The gyroscope 1, which may be driven electrically in the well-known way, is arranged to be brought to and maintained in a position in which its spin axis is tilted by about 5° to 10° to the vertical in pitch.

The platform 3 is pivotally mounted in a frame 4 by trunnion journals 5 and the frame 4 is pivotally mounted by trunnion journals 6 rotatable in bearing 7 fixed to the aircraft.

An electric servo system of any well-known type giving negligible reaction on the gyroscope operates on the pivot axes of the platform and frame to cause the platform to follow the motion of the gyroscope, the arrangement being such that the platform will be brought to a predetermined position, i. e. horizontal when the rotor spin axis is at the predetermined tilted position. The servo system comprises two motors, one 8 for moving the platform 3 about the roll axis and the other 9 for moving the platform about the pitch axis. Motor 8 drives one of the journals 6 through gearing 10 while the motor 9 drives through gearing 11 one of the journals 5; the motor 9 being attached to the frame 4, so that its drive is unaffected by the rocking of the frame.

Mounted on the platform 3 are two levers 12 and 13 of identical construction but disposed at 90° relatively to each other. Each lever has three arms 14, 15 and 16, and 14', 15' and 16', respectively, and is pivotally mounted at 17 and 17', respectively, in such a maner that it can move without appreciable friction in a plane parallel to the platform 3. The arms 14 and 14' carry weights 14a and 14b, respectively, the arms 15 and 15' having fork ends 18 and 18', respectively, for engaging a non-rotatable spindle 19 projecting from the gyro casing coaxial with the gyroscope spin axis, and the arms 16 and 16' carry armatures 20 and 20', respectively, of pick-ups. The weight 14b and the lever 13 form a pendulum (hereinafter referred to as the "pitch pendulum") which is constrained to move under forward acceleration or deceleration of the craft in a fore and aft direction and in so doing applies mechanically a torque about the roll axis of the gyro, thereby causing the gyro to precess about the pitch axis, proportional, within limits, to the acceleration or deceleration. Similarly the weight 14a and the lever 12 form a pendulum (hereinafter referred to as the "roll pendulum") which is constrained to move under transverse acceleration or deceleration in a lateral direction to apply a torque about the pitch axis of the gyro, thereby causing the gyro to precess about the roll axis.

It should be pointed out that the pick-up which is associated with mass 14b which is responsive to fore and aft accelerations and which mass effects pitch precession, produces a signal in accordance with roll movement because its armature 16' moves only with deflection of the gyroscope relative to the tiltable member or platform 3 in roll, and similarly, the pick-up associated with mass 14a which is responsive to roll acceleration and which mass 14a effects roll precession of the gyroscope, produces a signal in accordance with pitch movement because its armature 16 moves only with deflection of the gyroscope relative to the titlable member or platform 3 in pitch. This will be apparent from the use of the fork ends 18 and 18' on the arms 15 and 15'. Other types of pick-ups of course could be used.

Armatures 20 and 20' on levers 12 and 13 cooperate respectively with inductors or transformers 21* and 21 to form electrical pick-ups of known form, each inductor having three poles 22, 23, 24 and 22', 23' and 24' with windings thereon, the primary windings 25 and 25' on the centre poles 23 and 23' being connected across an A. C. supply 26. The secondary windings 27, 28 and 27', 28' are conected in opposition to each other and in series in the output circuits 29 and 30 respectively. The circuits 29 and 30 are connected through amplifiers 31, 32 respectively to the motors 8 and 9. In the central position of the armatures 20 and 20' no current will flow in the output circuits, but any displacement of the armatures will result in a signal in the output circuits which will cause the corresponding servo motor to move the platform until the tilt angle corresponds to the spin axis of the gyroscope.

In straight unaccelerated flight with a balanced gyro it is clear that the levers 12 and 13 will exert forces on the gyro due to the weights 14a and 14b unless the platform 3 is level. The direction of rotation of the gyro is such that when the platform is not level the torques due to the gravity effect on these weights will bring the platform slowly to the level position, through precession of the gyro.

Now consider the aircraft turning at constant air speed. It follows from purely geometric considerations (without taking into account any gyroscopic considerations) that in the absence of an erection system the effect on a forward tilted axis gyroscope of turning the aircraft is to cause the gimbal 2 and hence the platform 3 to roll. It is also clear that due to the action of centrifugal force on the roll pendulum the effect of the erection system acting alone without a tilt on the gyro is to cause the gimbal 2 and hence the platform 3 to roll in the opposite direction for the same sense of turning of the aircraft. These two effects when acting together cancel one another providing that the angle of tilt is adjusted to the forward speed of the aircraft, to the angular momentum of the gyro and to the effective weight moment of the roll pendulum. The two latter factors are constant for a given design, but the speed of the aircraft is a variable factor. It is therefore necessary for the tilt of the gyro to be varied with airspeed.

It so happens that assuming the tilt is correct for one airspeed, the effect of a change in airspeed causing an acceleration force on the pitch pendulum does automatically change the forward tilt of the gyro to the correct value for any other airspeed. This action would leave the platform tilted up or down in pitch after a change of speed and recovery would normally be slow, but by arranging that an A. C. voltage signal proportional to airspeed is added to that given by the pick-up 21*, the datum of this pick-up will be altered and the platform will settle in pitch with the pick-up armature in a different position. By adding these signals in the correct ratio it can be arranged that the platform keeps level during changing air speed.

The airspeed signal may be obtained by employing an air mileage unit described in British specification No. 565,214 and British patent application No. 10,932/45. This unit, indicated at 35, drives the rotor 36 of an induction generator, the stator of which carries two windings 37, 38, one winding 37 being connected in the supply circuit 26 and the other winding 38 being connected in the circuit 30 so that a signal proportional to changes in airspeed, as measured by the unit, is added to or subtracted from the signal from the pick-up 21*. An exactly similar argument can be employed to show that lateral speed requires a lateral tilt of the gyro axis for compensation and that this must be varied for change in lateral speed. Lateral speed is usually spoken of as sideslip and may be measured by means of an accelerometer measuring along the X—X axis. The side slip correction can be applied by connecting a potentiometer 41 in one side of the circuit 29, applying a constant voltage to the potentiometer 41 by connecting it to the supply circuit 26 and operatively connecting the slide 40 of the potentiometer to an accelerometer 39. Thus the signal from the pick-up 21 is varied proportional to the lateral accelerations arising from the side slip. The side slip correction is of course small and may be omitted.

Alternatively the connection can be applied by moving the pick-up device of the roll weight proportional to airspeed and the pick-up device of the pitch weight proportional to side slip.

The effect on the pitch weight of accelerating from 200 to 250 M. P. H. would be to increase the tilt of the gyroscope spin axis and to tilt the platform nose down by a few degrees. Since, however, an additional signal proportional to change in airspeed from 200 to 250 M. P. H. will be fed into the amplifier 32 and motor 9, the motor will tilt the platform nose up by the same number of degrees as that to which it was tilted down by the effect on the pitch weight. Hence the position of the platform will be unaffected by increases in airspeed. A similar effect will be obtained for lateral accelerations.

What we claim is:

1. In gyroscopic apparatus for defining the vertical in a moving vehicle and of the type including a member mounted for tilting movement about roll and pitch axes and a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, the combination of a servo system responsive to relative deflection between the gyroscope and the tiltable member and operating on the tiltable member to cause the member to follow the gyroscope and so define a given plane relative to the gyroscope when the gyroscope is erected, and means responsive to accelerations parallel to the plane defined by the tiltable member for applying precessing torques to the gyroscope.

2. In gyroscopic apparatus for defining the vertical in a moving vehicle and of the type including a member mounted for tilting movement about roll and pitch axes and a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, the combination of a servo system responsive to relative deflection between the gyroscope and the tiltable member and operating on the tiltable member to cause the member to follow the gyroscope and so define a horizontal plane when the gyroscope is erected, a pitch mass mounted on the tiltable member for fore and aft movement parallel to the plane defined by said member, means connecting said pitch mass to apply torque to the gyroscope about the roll axis and thereby to cause the gyroscope to precess in pitch when said pitch mass is subject to fore and aft accelerations, a roll mass mounted on the tiltable member for lateral movement parallel to the plane defined by said member, and means connecting said roll mass to apply torque to the gyroscope about the pitch axis and thereby to cause the gyroscope to precess in roll when said roll mass is subject to lateral accelerations.

3. In gyroscopic apparatus for defining the vertical in a moving vehicle and of the type including a member mounted for tilting movement about roll and pitch axes and a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, the combination of a servo system responsive to relative deflection between the gyroscope and the tiltable member and operating on the tiltable member to cause the member to follow the gyroscope and so define a horizontal plane when the gyroscope is erected, a pitch mass mounted pendulously on the tiltable member for fore and aft movement about an axis perpendicular to the plane defined by said tiltable member, an extension on said pitch mass cooperating with the gyroscope for applying torque to the gyroscope about the roll axis to cause the gyroscope to precess in pitch when subject to fore and aft accelerations, a roll mass mounted pendulously on the tiltable member for lateral movement about an axis perpendicular to the plane defined by said member, and an extension on said roll mass cooperating with the gyroscope for applying torque to the gyroscope about the pitch axis to cause the gyroscope to precess in roll when subject to lateral accelerations.

4. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, the combination of a servo system responsive to deflection of the tiltable member relative to the gyroscope to cause the tiltable member to follow the gyroscope, and means responsive to accelerations parallel to the plane defined by the tiltable member for applying precessing torques to the gyroscope.

5. In gyroscopic apparatus for defining the vertical in a moving vehicle and of the type including a member mounted for tilting movement about roll and pitch axes and a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, the combination of a servo system responsive to relative deflection between the gyroscope and the tiltable member and operating on the tiltable member to cause the member to follow the gyroscope and thereby to define a given plane relative to the gyroscope, said plane being horizontal when the gyroscope is erected, means responsive to accelerations parallel to the plane defined by the tiltable member for applying precessing torques to the gyroscopes, and means for assuring that said tiltable member remains in said horizontal plane during changes in the forward speed of the vehicle.

6. In gyroscopic apparatus for defining the vertical in a moving vehicle and of the type including a member mounted for tilting movement about roll and pitch axes and a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, the combination of a servo system responsive to relative deflection between the gyroscope and the tiltable member and operating on the latter to cause the tiltable member to follow the gyroscope and thereby to define a given plane relative to the gyroscope, said plane being horizontal when the gyroscope is erected, means responsive to accelerations parallel to the plane defined by the tiltable member for applying precessing torques to the gyroscope, and means for assuring that said tiltable member remains in said horizontal plane during changes in the lateral speed of the vehicle.

7. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a servo system responsive to deflection of the tiltable member relative to the gyroscope to cause said member to follow the gyroscope, a pitch mass mounted on the tiltable member for fore and aft movement parallel to the plane defined by said member, means connecting said pitch mass to apply torque to the gyroscope about the roll axis and thereby to cause said gyroscope to precess in pitch when subject to fore and aft accelerations, a roll mass mounted on the tiltable member for lateral movement parallel to the plane defined by said member, and means connecting said roll mass to apply torque to the gyroscope about the pitch axis to cause said gyroscope to precess in roll when subject to lateral accelerations.

8. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a servo system responsive to deflection of the tiltable member relative to the gyroscope to cause said member to follow the gyroscope, a pitch mass mounted pendulously on the tiltable member for fore and aft movement about an axis perpendicular to the plane defined by said member and having an extension cooperating with the gyroscope for applying torque to the latter about the roll axis to cause precession of the gyroscope in pitch when subject to fore and aft acceleration, and a roll mass mounted pendulously on the tiltable member for lateral movement about an axis perpendicular to the plane defined by said member and having an extension cooperating with the gyroscope for applying torque to the latter about the pitch axis to cause precession of the gyroscope in roll when subject to lateral accelerations.

9. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel and the upper end of the spin axis foremost in the direction of travel of the vehicle, and in which said tiltable member defines a plane having a given relation with said gyroscope spin axis when said gyro is erected, the combination of a servo system responsive to deflection of the tiltable member relative to the gyroscope to cause the member to follow the gyroscope, means responsive to accelerations parallel to the plane defined by the tiltable member for applying precessing torques to the gyroscope, and means for assuring that said tiltable member continues to define said given plane during changes in the forward speed of the vehicle.

10. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a servo system responsive to deflection of the tiltable member relative to the gyroscope to cause the member to follow the gyroscope, means responsive to accelerations parallel to the plane defined by the tiltable support member for applying precessing torques to the gyroscope, and means for assuring that said tiltable means continues to define said given plane during changes in the lateral speed of the vehicle.

11. In gyroscopic apparatus for defining the vertical in a moving vehicle and of the type including a member mounted for tilting movement about roll and pitch axes and a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a servo system for causing said tiltable member to follow the gyroscope and thereby to define a given plane relative to the gyroscope, said servo system including electric pickoff means responsive to relative deflection between the gyroscope and the tiltable member and means controlled by said pick off means for tilting the tiltable member, and means responsive to accelerations parallel to the plane defined by the tiltable member for applying precessing torques to the gyroscope.

12. In gyroscopic apparatus for defining the vertical in a moving vehicle and of the type in which a member mounted for tilting movement about roll and pitch axes carries a gyroscope on mounting for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a servo system including electric pick off means responsive to relative deflection between the gyroscope and the tiltable member and means controlled by said pick off means for tilting the tiltable member, and mechanical means operable directly on the gyroscope mounting and responsive to accelerations parallel to the plane defined by the tiltable member for applying precessing torques to the gyroscope.

13. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a servo system including pitch and roll electric pick off devices responsive to relative deflection between the gyroscope and the tiltable member about the pitch and roll axes, respectively, and means for tilting the tiltable member about the pitch and roll axes in accordance with the responses of said pitch and roll pick off devices, respectively, a pitch mass mounted on the tiltable member for fore and aft movement parallel to the plane defined by said member and connected to apply torque to the gyroscope about the roll axis to cause precession of the gyroscope in pitch when subject to fore and aft accelerations, and a roll mass mounted on the tiltable member for lateral movement parallel to the plane defined by said member and connected to apply torque to the gyroscope about the pitch axis to cause precession of the gyroscope in roll when subject to lateral accelerations.

14. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a two armed "pitch" bell crank lever fulcrumed on the tiltable member about an axis perpendicular to the plane defined by said member and having one arm extending laterally and carrying a pitch mass and the other arm extending fore and aft and engaging the gyroscope to apply torque thereto about the roll axis to cause precession of the gyroscope in pitch, a two armed "roll" bell crank lever fulcrumed on the tiltable member about an axis perpendicular to the plane defined by said member and having one arm extending fore and aft and carrying a roll mass and the other arm extending laterally and engaging the gyroscope to apply torque thereto about the pitch axis to cause precession of the gyroscope in roll, and a servo system including a "pitch" electric pick off device associated with the "roll" bell crank lever to produce by virtue of the pitch engagement of said "roll" lever with the gyroscope a signal according to pitch deflection of the gyroscope, a "roll" electric pick off device associated with the "pitch" bell crank lever to produce by virtue of the roll engagement of said lever with the gyroscope a signal according to roll deflection of the gyroscope, and means under the control of the "pitch" and "roll" pick off devices, respectively, for tilting the tiltable member about the pitch and roll axes.

15. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a servo system including pitch and roll electric pick off devices responsive to relative deflection between the gyroscope and the tiltable member about the pitch and roll axes, respectively, and means for tilting the tiltable member about the pitch and roll axes in accordance with the responses of said pitch and roll pick off devices, respectively, a pitch mass mounted on the tiltable member for fore and aft movement parallel to the plane defined by said member and connected to apply torque to the gyroscope about the roll axis to cause precession of the gyroscope in pitch when subject to fore and aft accelerations, a roll mass mounted on the tiltable member for lateral movement parallel to the plane defined by said member and connected to apply torque to the gyroscope about the pitch axis to cause precession of the gyroscope in roll when subject to lateral accelerations, and means producing an electric signal functionally related to forward speed of the vehicle and connected in the circuit of the pitch pick off to modify the control of the tilting means by the pitch pick off according to forward speed.

16. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a servo system including pitch and roll electric pick off devices responsive to relative deflection between the gyroscope and the tiltable member about the pitch and roll axes, respectively, and means for tilting the tiltable member about the pitch and roll axes in accordance with the responses of said pitch and roll pick off devices, respectively, a pitch mass mounted on the tiltable member for fore and aft movement parallel to the plane defined by said member and connected to apply torque to the gyroscope about the roll axis to cause precession of the gyroscope in pitch when subject to fore and aft accelerations, a roll mass mounted on the tiltable member for lateral movement parallel to the plane defined by said member and connected to apply torque to the gyroscope about the pitch axis to cause precession of the gyroscope in roll when subject to lateral accelerations, and means producing an electric signal functionally related to lateral movement of the vehicle and connected in the circuit of the roll pick off to modify the control of the tilting means by the roll pick off in accordance with lateral movement of the vehicle.

17. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a servo system including pitch and roll electric pick off devices responsive to relative deflection between the gyroscope and the tiltable member about the pitch and roll axes, respectively, and means for tilting the tiltable member about the pitch and roll axes in accordance with the responses of said pitch and roll pick off devices, respectively, a pitch mass mounted on the tiltable member for fore and aft movement parallel to the plane defined by said member and connected to apply torque to the gyroscope about the roll axis to cause precession of the gyroscope in pitch when subject to fore and aft accelerations, a roll mass mounted on the tiltable member for lateral movement parallel to the plane defined by said member and connected to apply torque to the gyroscope about the pitch axis to cause precession of the gyroscope in roll when subject to lateral accelerations, means producing an electric signal functionally related to forward speed of the vehicle and connected in the circuit of the pitch pick off to modify the control of the tilting means by the pitch pick off as a function of forward speed, and means producing an electric signal functionally related to the lateral movement of the vehicle and connected in the circuit of the roll pick off to modify the control of the tilting means by the roll pick off as a function of lateral movement of the vehicle.

18. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a two armed pitch bell crank lever fulcrumed on the tiltable member about an axis perpendicular to the plane defined by said member and having one arm extending laterally and carrying a pitch mass and the other arm extending fore and aft and engaging the gyroscope to apply torque to the gyroscope about the roll axis to cause precession of the gyroscope in pitch, a two armed roll bell crank lever fulcrumed on the tiltable member about an axis perpendicular to the plane defined by said member and having one arm extending fore and aft and carrying a roll mass and the other arm extending laterally and engaging the gyroscope to apply torque to the gyroscope about the pitch axis to cause precession of the gyroscope in roll, and a servo system including a pitch electric pick off device associated with the roll bell crank lever to produce by virtue of the pitch engagement of said roll lever with the gyroscope a signal according to pitch deflection of the gyroscope, a roll electric pick off device associated with the pitch bell crank lever to produce by virtue of the roll engagement of said lever with the gyroscope a signal according to roll deflection of the gyroscope, and means under the control of the pitch and roll pick off devices for tilting the tiltable member about the pitch and roll axes, respectively, and means producing an electric signal functionally related to forward speed of the vehicle and connected in the circuit of the pitch pick off to modify the control of the tilting means by the pitch pick off according to forward speed.

19. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a two armed pitch bell crank lever fulcrumed on the tiltable member about an axis perpendicular to the plane defined by said member and having one arm extending laterally and carrying a pitch mass and the other arm extending fore and aft and engaging the gyroscope to apply torque to the gyroscope about the roll axis to cause precession of the gyroscope in pitch, a two armed roll bell crank lever fulcrumed on the tiltable member about an axis perpendicular to the plane defined by said member and having one arm extending fore and aft and carrying a roll mass and the other arm extending laterally and engaging the gyroscope to apply torque to the gyroscope about the pitch axis to cause precession of the gyroscope in roll, a servo system including a pitch electric pick off device associated with the roll bell crank lever to produce by virtue of the pitch engagement of said roll lever with the gyroscope a signal according to pitch deflection of the gyroscope, a roll electric pick off device associated with the pitch bell crank lever to produce by virtue of the roll engagement of said lever with the gyroscope a signal according to roll deflection of the gyroscope, and means under the control of the pitch and roll pick off devices for tilting the tiltable member about the pitch and roll axes, respectively, and means producing an electric signal functionally related to lateral movement of the vehicle and connected in the circuit of the roll pick off to modify the control of the tilting means by the roll pick off as a function of lateral movement of the vehicle.

20. In gyroscopic apparatus for defining the vertical in a moving vehicle and of the type in which a member mounted for tilting movement about roll and pitch axes carries a gyroscope mounted for movement about the roll and pitch axes relative to the tiltable member and having the spin axis of the gyroscope normally displaced from the vertical in the direction of travel with the upper end of the spin axis foremost in the direction of travel of the vehicle, and in which said tiltable member defines a plane having a given relation with said gyroscope spin axis when said gyro is erected, the combination of a two armed pitch bell crank lever fulcrumed on the tiltable member about an axis perpendicular to the plane defined by said member and having one arm extending laterally and carrrying a pitch mass and the other arm extending fore and aft and engaging the gyroscope to apply torque to the gyroscope about the roll axis to cause precession of the gyroscope in pitch, a two armed roll bell crank lever fulcrumed on the tiltable member about an axis perpendicular to the plane defined by said member and having one arm extending fore and aft and carrying a roll mass and the other arm extending laterally and engaging the gyroscope to apply torque to the gyroscope about the pitch axis to cause precession of the gyroscope in roll, a servo system including a pitch electric pick off device associated with the roll bell crank lever to produce by virtue of the pitch engagement of said roll lever with the gyroscope a signal according to pitch deflection of the gyroscope, a roll electric pick off device associated with the pitch bell crank lever to produce by virtue of the roll engagement of said lever with the gyroscope a signal according to roll deflection of the gyroscope, and means under the control of the pitch and roll pick off devices for tilting the tiltable member about the pitch and roll axes, respectively, means producing an electric signal according to forward speed of the vehicle and connected in the circuit of the pitch pick off to modify according to forward speed the control of the tilting means by the pitch pick off, and means producing an electric signal according to any lateral movement of the vehicle and connected in the circuit of the roll pick off to modify according to any lateral movement of the vehicle the control of the tilting means by the roll pick off.

JEFFERY WALTON BARNES.
JOHN ST. LEGER PHILPOT.

REFERENCES CITED

The following references are of record in the file of this patent:

UNITED STATES PATENTS

| Number | Name | Date |
|---|---|---|
| 1,518,762 | Tanner | Dec. 9, 1924 |
| 1,628,136 | Ford | May 10, 1927 |
| 1,826,013 | Meredith | Oct. 6, 1931 |
| 1,932,210 | Glitscher | Oct. 24, 1933 |
| 2,041,526 | Carter | May 19, 1936 |
| 2,188,606 | Koster | Jan. 30, 1940 |
| 2,427,130 | Ford | Sept. 6, 1947 |

FOREIGN PATENTS

| Number | Country | Date |
|---|---|---|
| 365,188 | Great Britain | June 23, 1926 |
| 544,756 | Great Britain | Apr. 27, 1942 |